United States Patent [19]
Lo et al.

[11] Patent Number: 6,055,594
[45] Date of Patent: Apr. 25, 2000

[54] BYTE ACCESSIBLE MEMORY INTERFACE USING REDUCED MEMORY CONTROL PIN COUNT

[75] Inventors: Burton B. Lo, San Francisco; Anthony L. Pan, Fremont, both of Calif.

[73] Assignee: 3Com Corporation, Santa Clara, Calif.

[21] Appl. No.: 09/139,148

[22] Filed: Aug. 24, 1998

[51] Int. Cl.[7] .................................................... G06F 13/00
[52] U.S. Cl. ............................. 710/100; 710/11; 710/22; 710/127; 710/129; 712/11; 712/13; 712/14; 712/20; 712/22; 712/203; 712/222; 326/39; 326/41; 326/46; 327/142; 327/174; 327/176; 327/227; 327/292
[58] Field of Search ............................. 710/100, 11, 22, 710/127, 129; 711/135; 712/222, 14, 11, 13, 20, 22, 203; 326/39, 41, 46; 327/142, 227, 176, 174, 292; 331/49; 364/231.9; 365/189.02

[56] References Cited

U.S. PATENT DOCUMENTS

4,314,332  2/1982  Shiraogawa et al. .................... 711/201
5,822,550  10/1998  Milhaupt et al. ........................ 710/126

*Primary Examiner*—Ayaz R. Sheikh
*Assistant Examiner*—Frantz Blanchard Jean
*Attorney, Agent, or Firm*—Wagner, Murabito & Hao LLP

[57] ABSTRACT

A byte accessible memory interface circuit using a reduced set of memory control signals. The present invention includes an interface circuit having a reduced set of memory control signals for performing word length reads and writes to an external memory module containing a plurality of integrated circuit (IC) memory chips. The interface circuit contains a respective multiplexer and a respective register circuit for each byte of the word length data. The multiplexers select a byte of data from either an on-chip data bus or from a bus carrying data read from the external memory module. To perform a full length word write, the data from the on-chip bus is loaded into the registers (via the multiplexers) and then written to the memory module. To perform a partial length word write, a pre-read operation is performed at the target address and a word length data is loaded into the registers. The new data is then received over the on-chip data bus and routed by the multiplexers into the byte locations to be changed. The properly merged data is then written as a full length word to the memory module. To perform a full length word read, a word of data is loaded into the byte registers and then forwarded over the on-chip data bus. By the provision of a pre-read operation, all of the IC memory chips can share the same chip enable, output enable and write enable control signals thereby reducing pin count on the integrated circuit that contains the interface circuit.

16 Claims, 9 Drawing Sheets

FIGURE 1

( Prior Art )

BYTE ACCESSIBLE MEMORY INTERFACE USING REDUCED MEMORY CONTROL PIN COUNT

BACKGROUND OF THE INVENTION

1. Field of the Invention

The present invention relates to the field of digital electronic systems. More particularly, the present invention relates to the field of interface circuits used for the communication of information between an external memory module and an integrated circuit (IC) chip.

2. Related Art

Digital computer systems, and many electronic devices, typically contain one or more integrated circuit (IC) chips that are coupled to an external memory module using a memory interface. The memory interface provides communication between the IC chip and the memory module and contains address bus lines, data bus lines and control signal lines. Recent developments in the computer industry have placed large demands on the amount of memory and signal processing capabilities required of digital computer systems. These demands have lead to larger and larger data bus sizes to improve data storage, data throughput and data communication bandwidths. Generally, the larger the bus size, the greater its bandwidth. For instance, it is not uncommon for a memory interface to contain a 16-bit, a 32-bit or a 64-bit data bus. A typical 32-bit data bus can move four 8-bit bytes worth of data in a single clock cycle.

Figure 1:
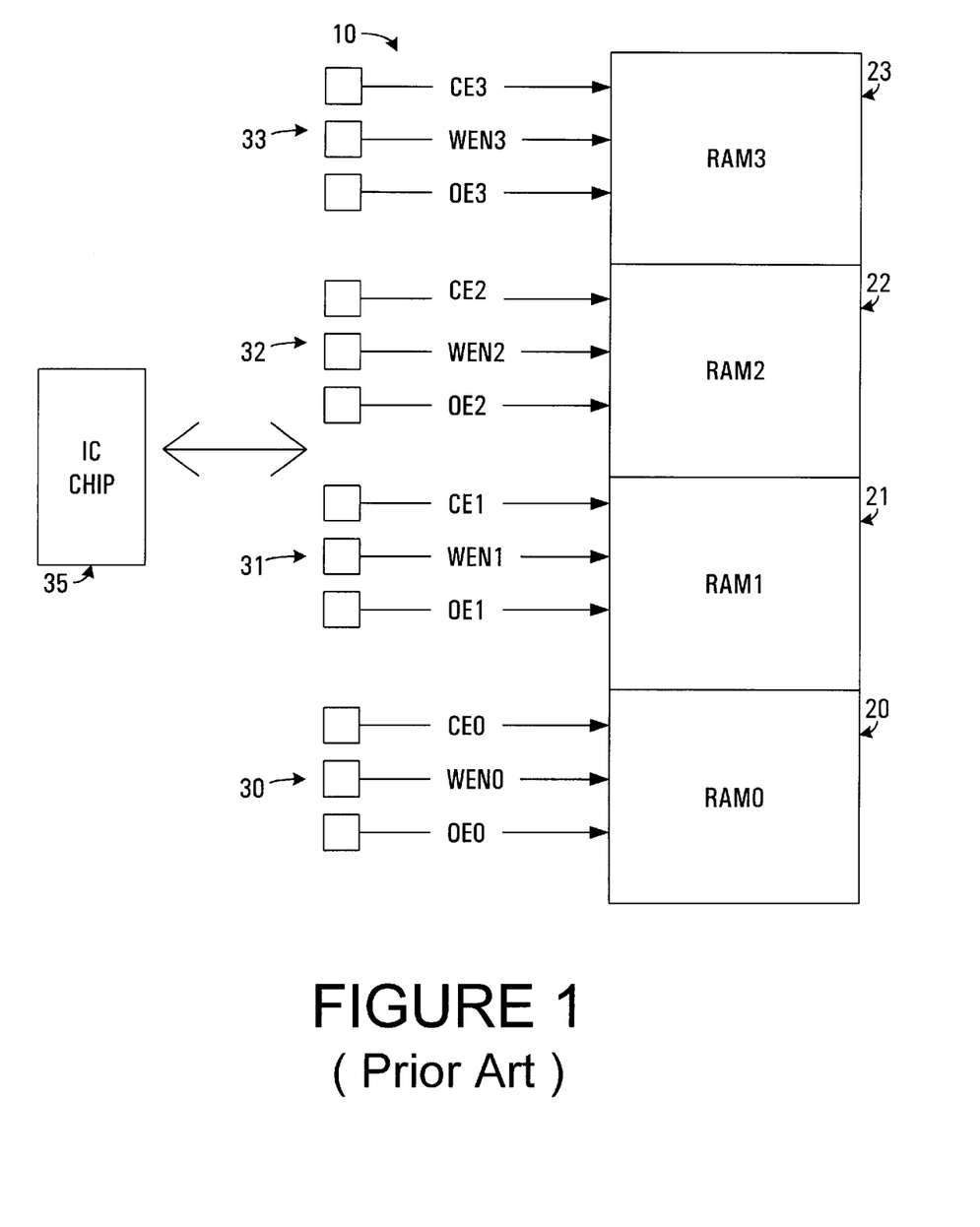
FIG. 1 illustrates the control signals involved in accordance with a prior art memory interface technique.

Memory modules often contain a collection of separate memory units ("chips") that are addressed by the memory interface and are used collectively to provide the memory requirements for the IC chip. For instance, to provide a memory module having a 32-bit word length and having a storage capacity of 32K words, four 8-bit memory chips can be used in parallel within the memory module. FIG. 1 illustrates a memory module 10 having four 8-bit memory IC chips 20–23, each memory IC chip having a 32K byte capacity. An IC chip 35 is also shown. Each of the four memory IC chips 20–23 of module 10 receives an entire address bus (not shown) in parallel from the memory interface and also each memory IC chip receives a respective 8-bit portion of a 32-bit data bus (not shown) of the memory interface.

Importantly, in order to allow the words of the memory module 10 to be individually byte accessible to the IC chip 35, each of the memory IC chips 20–23 of memory module 10 requires a separate set of control signals which are shown in FIG. 1. The IC chip 35 generates these separate control signals for memory module 10. For example, there are four separate sets of control signals 30–33 shown in FIG. 1. Each set of control signals is used for a respective memory IC chip and each set of control signals includes a chip enable (CE), a write enable (WEN) and an output enable (OE) signal. The syntax "N" merely indicates an active low condition. By requiring a separate set of control signals for each memory IC chip, the pin count for the IC chip 35 is increased to accommodate the total number of control signals. For instance, at least 12 pins are required to provide the control signal interface of FIG. 1 to provide byte accessibility.

There are many advantages of reducing the pin count for an IC chip. For instance, by making the pin count smaller, the size of the IC chip can be reduced. Often, it is the number of pins, not necessarily the size of the integrated circuit die, that has the largest impact on the size of a chip device. The term "pad limited" refers to IC designs whose chip size is limited by the number of pads associated with the chip device, not its integrated circuit die size. There are many advantages in reducing the size of the chip device. By reducing the size of the IC chip, it can be manufactured more economically and, further, it can advantageously be used in more designs where size is a critical factor (e.g., in portable devices, in cell phones, etc.). Also, smaller sized IC chips generally dissipate less power. Therefore, by reducing the size of the IC chip, it can be made available for more designs where reduced power dissipation is an important consideration (e.g., in battery operated devices, in portable devices, etc.). Lastly, by reducing the pin count on the IC chip, its manufacturing and operational quality improves by reducing the error-prone tasks pad bonding. Therefore, an IC chip having reduced pin count can be made in greater yields thereby again reducing its manufacturing costs.

Heretofore, byte accessibility within for a memory module in combination with an IC chip has required increased pin count for the IC chip due to the requirement that each memory IC chip receive separate control signals. Therefore, heretofore, integrated circuit devices offering byte accessibility of a memory module, as described above, have not enjoyed the size, reliability and economical benefits of a reduced pin count IC chip.

Accordingly, what is needed is an efficient memory interface between an integrated circuit and an external memory module that allows byte accessibility of the memory module. What is needed further is a memory interface design having a large data bus but avoiding the problems associated with the high pin count required of the separate control signals of the prior art. The present invention provides these advantageous capabilities. These and other advantages of the present invention not specifically mentioned above will become clear within discussions of the present invention presented herein.

SUMMARY OF THE INVENTION

A byte accessible memory interface circuit is described herein that uses a reduced set of memory control signals. The present invention includes an interface circuit having a reduced set of memory control signals for performing word length reads and writes to an external memory module containing a plurality of integrated circuit (IC) memory chips. The interface circuit contains a respective multiplexer coupled to a respective register circuit for each byte of the word length data. The multiplexers select a byte of data from either an on-chip data bus or from a bus carrying data read from a respective byte location of the external memory module.

To perform a full length word write, the data from the on-chip data bus is loaded into the registers (via the multiplexers) and then written to the memory module. To perform a partial length word write, a pre-read operation is performed at the target address and a word length data is loaded into the registers via the multiplexers. The new data is then received over the on-chip data bus and routed by the multiplexers into the byte locations to be changed. The properly merged data is then written as a full length word to the memory module. To perform a full length word read, a word of data is loaded into the byte registers and then forwarded over the on-chip data bus. Since partial word length writes typically only occur at the start and end words of a data packet transmission, the performance degradation of the pre-read operation is minimal. By the provision of a pre-read operation, all of the IC memory chips can share the same chip enable, output enable and write enable control signals thereby reducing pin count on the integrated circuit that contains the interface circuit.

Specifically, embodiments of the present invention include an integrated circuit device for performing byte accessible memory operations with an external memory module having memory integrated circuit (IC) chips. The integrated circuit device having: a first internal data bus having a plurality of individual byte portions; a plurality of multiplexers coupled to the first internal data bus wherein each multiplexer of the plurality of multiplexers is coupled to a respective byte portion of the plurality of individual byte portions of the first internal data bus; a plurality of registers coupled to the plurality of multiplexers wherein each register is coupled to an output of a respective multiplexer of the plurality of multiplexers; a second internal data bus for coupling to the external memory module, the second internal data bus having a plurality of individual byte portions wherein each byte portion is coupled to an output of a respective register, wherein further, each byte portion of the second internal data bus is also coupled back to an input of its associated multiplexer; and a single chip enable pad, a single output enable pad and a single write enable pad coupled in parallel to each memory IC chip for commonly controlling all memory IC chips of the memory module.

Embodiments include the above and further comprising a state machine circuit for performing partial word write operations by: preloading a full word of data from the external memory module into the plurality of registers by controlling all of the plurality of multiplexers to select inputs coupled to the respective byte portions of the second internal data bus; and then by merging individual byte data from the first internal data bus into the full word by controlling only a portion of the plurality of multiplexers to select inputs coupled to the respective byte portions of the first internal data bus.

DETAILED DESCRIPTION OF THE INVENTION

In the following detailed description of the present invention, a byte accessible memory interface circuit having a reduced set of memory control signals for reduced IC pin count, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 2:
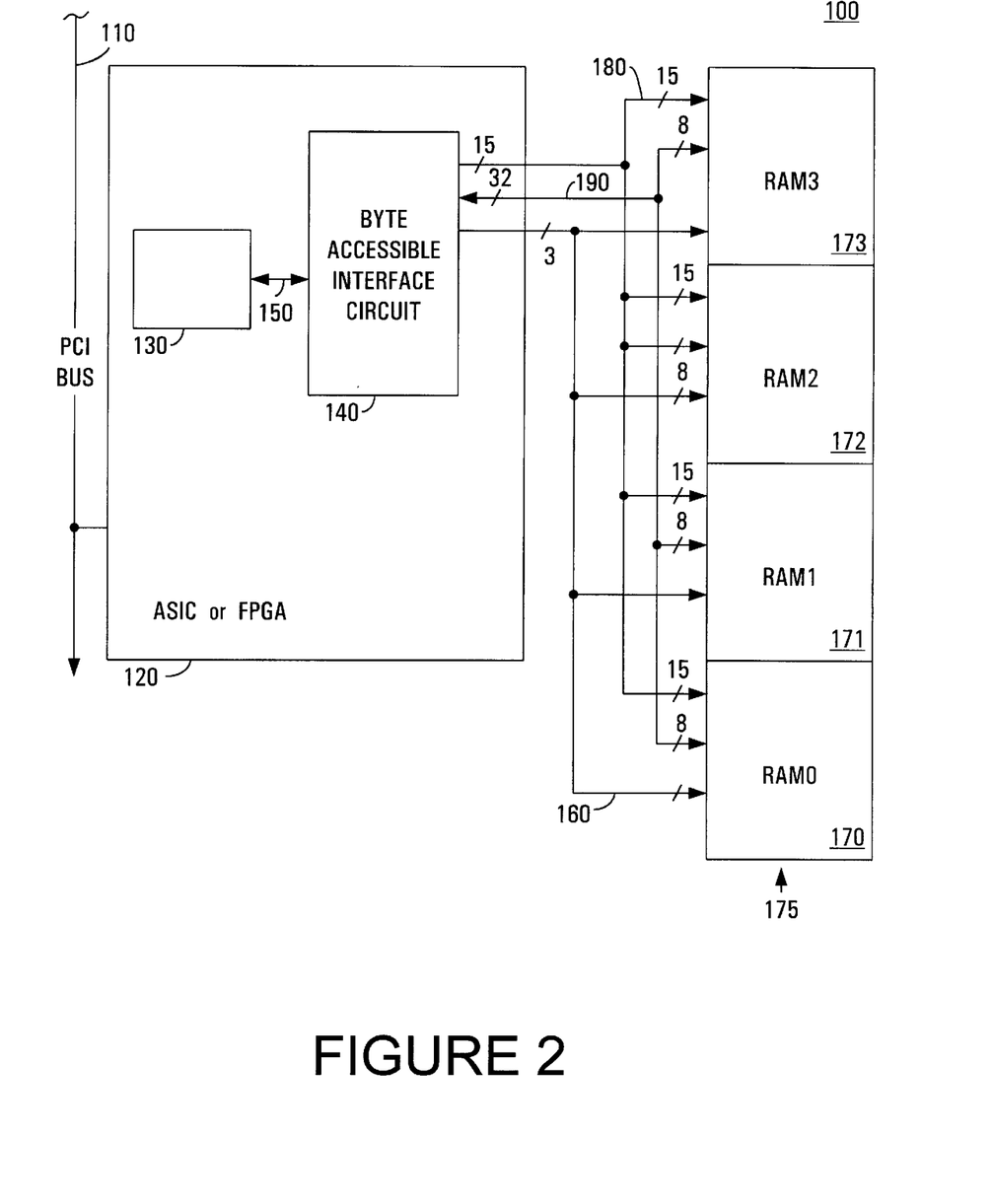
FIG. 2 is a system level diagram in accordance with the present invention illustrating the byte accessible interface circuit of the present invention and a memory module.

FIG. 2 illustrates a digital system 100 in which embodiments of the present invention operate. Digital system 100 includes an integrated circuit (IC) chip 120 which can be, for example, an application specific integrated circuit (ASIC) or a field programmable gate array (FPGA) circuit. The IC chip 120 is coupled to a host bus, e.g., a peripheral component interconnect (PCI) bus 110. It is appreciated that the host bus 110 can be of any communication standard and the PCI standard is shown as an example only. The IC chip 120 contains one or more circuits 130 that either receive data from bus 110, from circuit 140, or generate data. The data from circuit 130 is passed over internal bus 150 to the byte accessible interface circuit ("interface circuit") 140 of the present invention. The interface circuit 140 is located within IC chip 120.

The IC chip 120 contains a number of pads, each pad is coupled to an external pin. The external pins allow IC chip 120 to coupled with, and thereby communicate with, an external memory module 175 using the interface circuit 140 of the present invention. The interface circuit 140 of the present invention is specially designed for reducing the pins of IC chip 120 required for interfacing with external memory module 175. With this reduced pin count, using the interface circuit 140, the IC chip 120 can advantageously perform byte accessible write and read operations with the external memory module 175. More specifically, memory module 175 is coupled to the IC chip 120 via an address bus 180, a multi-bit bidirectional data bus 190 and a control bus 160. The lines of the control bus 160 are minimized in accordance with the present invention while still offering byte accessibility. In one embodiment, the data bus 190 is a 32-bit bus, however, the present invention is equally well suited for application with any size data bus.

It is appreciated that the memory module 175 of FIG. 2 contains multiple individual memory integrated circuit (IC) chips 170–173. The memory IC chips can be static random access memories (SRAMs). In one embodiment of the present invention, each memory IC chip stores 32K bytes and has a data length of 8-bits. Respective byte portions of the data bus 190 are therefore coupled to respective memory IC chips. In this instance, each memory IC chip comprises only one byte portion of the full 32-bit word carried by the data bus 190. For instance, assuming a 32-bit data bus (d31 . . . d0), the least significant data bits (e.g., d7 . . . d0) of data bus 190 are coupled to RAM0 170. The next data bits (e.g., d15 . . . d8) of data bus 190 are coupled to RAM1 171. The next data bits (e.g., d23 . . . d16) of data bus 190 are coupled to RAM2 172. The most significant bits (e.g., d31 . . . d24) of data bus 190 are coupled to RAM3 173.

In one embodiment, each memory IC chip of 170–173 has storage capacity for 32K. Therefore, a 15-bit address bus 180 is used (although the size of the address bus 180 can vary depending on the storage capacity of the memory used). All 15 bits of the address bus 180 are coupled in parallel to each of the memory IC chips 170–173 so that the proper bytes of an addressed 32-bit word are accessed. As described more fully below, the control signal lines of bus 160 are coupled in parallel to all of the memory IC chips 170–173 so that the memory IC chips 170–173 are controlled in common by the same set of control signals. Although this is the case, the present invention nevertheless provides for byte accessibility within the interface circuit 140 through a circuit mechanism involving a pre-read operation and data merging.

In operation, the interface circuit 140 of FIG. 2 performs data read and data write operations with respect to the external memory module 175. These operations utilize the memory interface which includes the address bus 180, the data bus 190 and the control signal bus 160. Byte accessible writes (e.g., "partial word writes") are allowed by the interface circuit 140. That is, interface circuit 140 can write to specific bytes of a 32-bit word while simultaneously leaving the remainder of the 32-bit word unchanged. The present invention utilizes a special control signal bus having a reduced pin count to accomplish this functionality. By using a control bus having reduced pin count, the total pin count of the IC chip 120 can thereby be reduced. A reduced pin count permits the size of the IC chip 120 to also be advantageously reduced in size.

Figure 3:
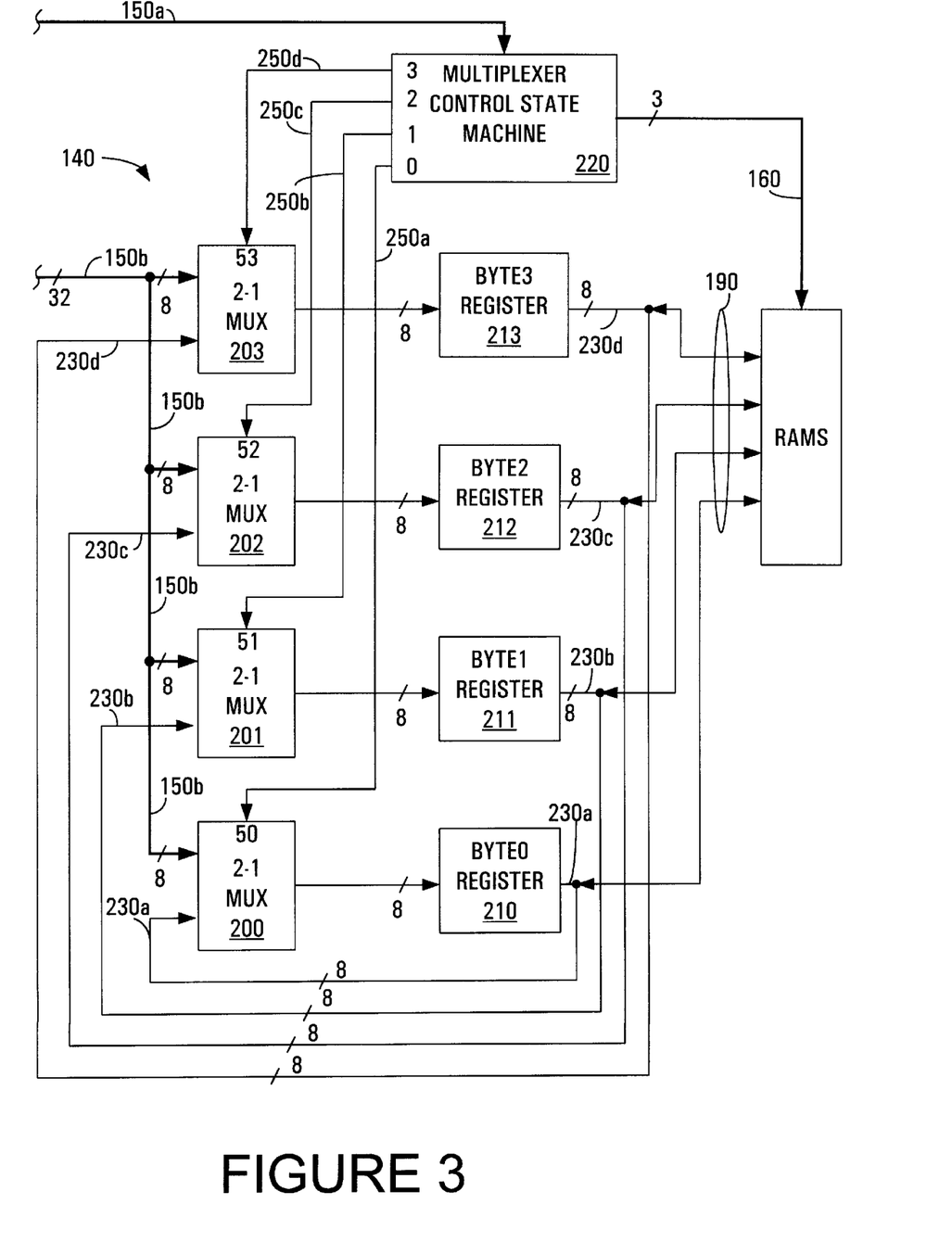
FIG. 3 is a circuit level diagram of the byte accessible interface circuit of the present invention.

FIG. 3 is a circuit schematic diagram of the interface circuit 140 of the present invention. Interface circuit 140 receives a first internal data bus 150b which is part of internal bus 150 (FIG. 2). In one embodiment, the first internal data bus 150b is a 32-bit bidirectional bus (but could be of any size) and is located within IC chip 120 (FIG. 2). Internal data bus 150b of FIG. 3 carries data to be written to external memory module 175 and can carry data read from external memory module 175 to other circuit portions within IC chip 120. Interface circuit 140 includes a plurality of multiplexers 200–203. In one embodiment, four multiplexer circuits 200–203 are used and each multiplexer receives one byte of data from the first internal data bus 150b. Specifically, a different respective byte portion of data bus 150b is coupled to the first input of each multiplexer of 200–203. Therefore, assuming a 32-bit data bus (d31 . . . d0), the least significant data bits (e.g., d7 . . . d0) of data bus 150b are coupled to the first input of multiplexer 200. The next data bits (e.g., d15 . . . d8) of data bus 150b are coupled to the first input of multiplexer 201. The next data bits (e.g., d23 . . . d16) of data bus 150b are coupled to the first input of multiplexer 202. Lastly, the most significant bits (e.g., d31 . . . d24) of data bus 150b are coupled to the first input of multiplexer 203.

Each multiplexer of 200–203 of FIG. 3 also receives a select control signal over a signal line of signal lines 250a–250d. Signal lines 250a–250d are collectively referred to as bus 250. Multiplexer 200 is controlled by control signals from select line 250a. Multiplexer 201 is controlled by control signals from select line 250b. Multiplexer 202 is controlled by control signals from select line 250c. Lastly, multiplexer 203 is controlled by control signals from select line 250d. Control signals over signal lines 250a–250d are generated by a multiplexer control state machine ("state machine") 220. When a control line of bus 250 carries a logical "0," data is selected from the first input of the associated multiplexer. State machine 220 also generates the memory control signals of control bus 160. Control bus 160 is a three bit bus in accordance with the present invention and carries a single chip enable line, a single output enable line and a single write enable line. State machine 220 also receives memory operation control signals over control bus 150a which is part of bus 150.

The output of each multiplexer 200–203 of FIG. 3 is coupled to a respective byte register of byte registers 210–213. Specifically, the output of multiplexer 200 is coupled to the input of byte register 210. The output of multiplexer 201 is coupled to the input of byte register 211. The output of multiplexer 202 is coupled to the input of byte register 212. Lastly, the output of multiplexer 203 is coupled to the input of byte register 213. The outputs of the byte registers 210–213 are driven as separate byte portions over a second internal data bus 190. In one embodiment, the second internal data bus is 32-bits wide bi-directional bus (but could be of any size).

The 8-bit bus 230a of FIG. 3 is coupled to the output of byte register 210, comprises data bits (d7 . . . d0) of data bus 190 and is also coupled back in a feedback configuration to the second input of multiplexer 200. The next 8-bit bus 230b is coupled to the output of byte register 211, comprises data bits (d15 . . . d8) of data bus 190 and is also coupled back in a feedback configuration to the second input of multiplexer 201. The next 8-bit bus 230c is coupled to the output of byte register 212, comprises data bits (d23 . . . d16) of data bus 190 and is also coupled back in a feedback configuration to the second input of multiplexer 202. The last 8-bit bus 230d is coupled to the output of byte register 213, comprises data bits (d31 . . . d24) of data bus 190 and is also coupled back in a feedback configuration to the second input of multiplexer 203. When a control line of bus 250 carries a logical "0," data is selected from the first input of the associated multiplexer.

In this configuration, the state machine 220 controls the multiplexers 200–203 such that any multiplexer can select data from the first internal data bus 150b or from the second internal data bus 190. It is appreciated that the second internal data bus 190 is coupled to external memory module 175. A value of logical "0" over any of the select control lines 250a–250d indicates that the associated multiplexer is to select data from the first internal data bus 150b. Likewise, a value of logical "1" over any of the select control lines 250a–250d indicates that the associated multiplexer is to select (e.g., "re-circulate") data from the second internal data bus 190.

In operation, the interface circuit 140 performs as follows. For a full 32-bit data write operation, all multiplexers 200–203 are controlled by state machine 220 to select four 8-bit bytes from the first internal data bus 150b. This 32-bit word is then loaded and latched into the four byte registers 210–213. The registers 210–213 maintain this 32-bit word over the 32-bit second internal data bus 190 (which is coupled to the external memory module 175). Proper address data is then asserted over address line 180 (FIG. 2) and a write cycle then commences thereby causing the 32-bit word to be written into the addressed location within memory module 175.

However, for a partial word write (e.g., where individual bytes of the word are therefore accessible), a pre-read operation is performed on the word location. Data from the external memory module 175 is therefore presented over data bus 190 and all multiplexers 200–203 are controlled by state machine 220 to select four 8-bit bytes from the second internal data bus 190. At this point, the registers 210–213 contain the word of data stored at the word location. Then, a data merge operation is performed whereby the multiplexers associated with the bytes to be changed are controlled by state machine 220 to select one or more bytes of data from the first internal data bus 150b. This byte data from internal data bus 150b then overrides the corresponding data within the associated byte registers. The resulting new 32-bit word is then latched into the four byte registers 210–213. The registers 210–213 maintain this 32-bit word over the 32-bit second internal data bus 190. The same address data of the word location is then asserted over address line 180 (FIG. 2) and a write cycle commences thereby causing the new 32-bit word to be written into the addressed word location within memory module 175. The control lines 150a–150d carry information to indicate which bytes are to be changed in the partial word write operation. The state machine 220 utilizes this information in generating the required signals over control bus 250.

For example, assume the value of 0×4455_3322 is already in a given memory location of external memory module 175 of FIG. 3 and it is desired to only modify the 2nd most significant byte from the value of 0×55 to the value of 0×AA. In this case, word 0×4455_3322 is first read out of the external memory module (during a pre-read operation), then 0×44AA_3322 is written back to the given memory location in the second cycle (e.g., the subsequent write cycle). From the point of view of the external memory module 175, only full words are accessed. However, the circuitry within the interface circuit 140 of the present invention allows byte accessibility via data merging.

Therefore, a full 32-bit write operation consumes only one cycle. A partial word write operation consumes two cycles which include a first pre-read cycle and a second cycle for data merging and writing back. Since partial word writes typically occur only in the start and end words of lengthy data packet transmissions, the additional pre-read cycle of the present invention does not negatively impact data transmission performance. For a read operation, a read cycle is performed at a word location thereby causing a word of data to be read over data bus 190 and then stored into the IC chip 120.

Figure 4:
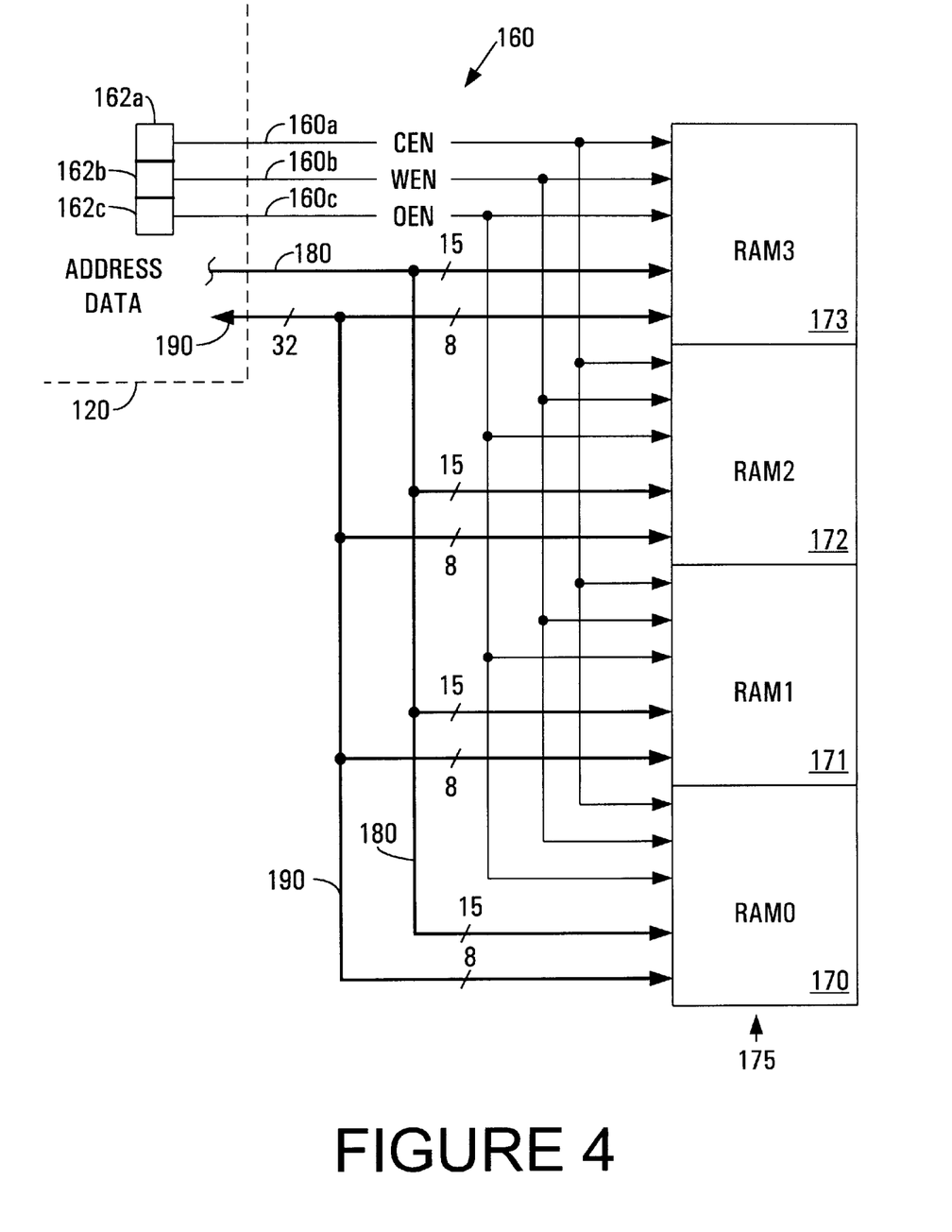
FIG. 4 illustrates the control, address and data signals used by the byte accessible interface circuit of the present invention.

FIG. 4 illustrates the address bus 180, the data bus 190 and the signals of the control bus 160 used in the memory interface of the present invention. The state machine circuit 220 (FIG. 3) generates the signals over the control bus 160. The control bus 160 contains a chip enable signal line 160a coupled to pad 162a of the IC chip 120. The control bus 160 also contains a write enable line 160b coupled to pad 162b of the IC chip 120. Lastly, the control bus 160 contains an output enable line 160c coupled to pad 162c of the IC chip 120. In this configuration, the IC chip 120 advantageously contains only three pads (e.g., pins) dedicated to the control signal bus 160 thereby providing a reduced pin count for controlling the memory IC chips 170–173. By having a reduced pin count, the size of the IC chip 120 can advantageously be reduced. In operation, during a write operation, all of the memory IC chips 170–173 are commonly enabled by bus 160 for writing data and a full word of data is written into external memory module 175. Likewise, during a read operation, all of the memory IC chips 170–173 are commonly enabled by bus 160 for reading data and an entire word of data is read from the external memory module 175. Byte accessibility of the word data is therefore performed by the combination of the pre-read operation, the data merging operations described above with respect to FIG. 3, and the subsequent full word write operation.

All pins of the address bus 180 of FIG. 4 are coupled in parallel to each of the memory IC chips 170–173. As discussed above, each memory IC chip of chips 170–173 receives a separate byte portion of the data bus 190. It is appreciated that the portion of data bus 190 shown in FIG. 4 (outside of dashed box 120) is external to the IC chip 120 and is used for coupling the external memory module 175 to the IC chip 120.

Figure 5:
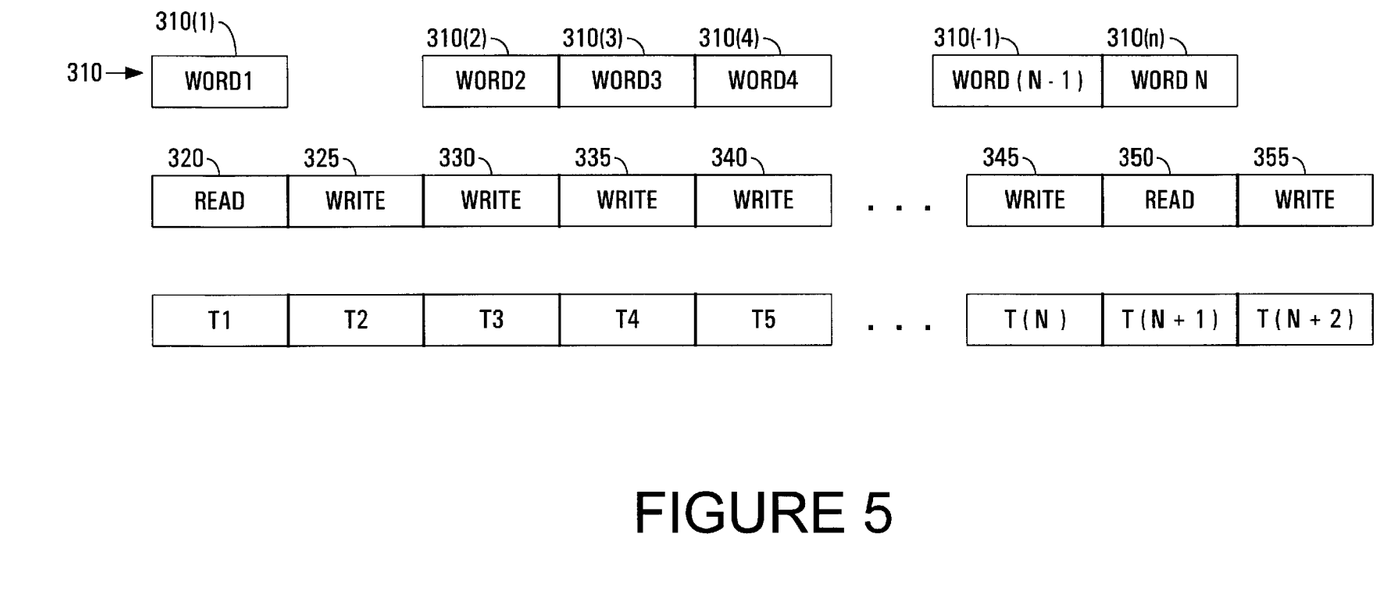
FIG. 5 is a timing diagram illustrating the cycles required to transfer a typical data packet including n words using the byte accessible interface circuit of the present invention.

FIG. 5 illustrates an exemplary data packet being transferred from the IC chip 120 to the external memory module 175 in accordance with the operations of the interface circuit 140 of the present invention. The exemplary data packet 310 contains N number of words (e.g., each word being 32-bits in one embodiment). The words are referenced as 310(1) –310(N). The memory cycles performed for transferring the words of the data packet 310 are shown as T1 to T(N+2). In this example, it is assumed that the first data word 310(1) and the last data word 310(N) are only partial word writes and therefore require byte accessibility with respect to the external memory module 175. For timing analysis, this configuration marks the worst case scenario for the present invention when operating in a bursting transaction.

As shown in FIG. 5, interface circuit 140 performs a pre-read operation 320 followed by a data merge and write operation 325 for word1 310(1) of the data packet 310. This consumes two memory cycles. Words 310(2) through 310 (N−1) are full word write operations, e.g., write operations 330–345, and therefore interface circuit 140 does not perform any pre-read operations for these words. The transfer of these words therefore consumes only one memory cycle each. The last word, 310(N), is a partial word write and therefore interface circuit 140 performs a pre-read operation 350 followed by a data merge and write operation 355. Again, this consumes two memory cycles. The maximum total number of memory cycles required to transfer a data packet 310 of N words, using the present invention, is N+2 cycles. It is appreciated that the performance hit in issuing the pre-read operations is not significant given the typical data packet size (e.g., large N).

Therefore, the present invention advantageously saves pin count on the IC chip 120 without any significant performance degradation. The pin savings in accordance with the present invention increases as the number of memory IC chips increases. For instance, for 4 byte wide RAM designs, the present invention saves at least 3 pins on the IC chip 120. For 8 byte wide RAM designs, the present invention saves 7 pins on the IC chip 120. For IC chips that are pad limited, this savings can be quite large and important.

Figure 6:
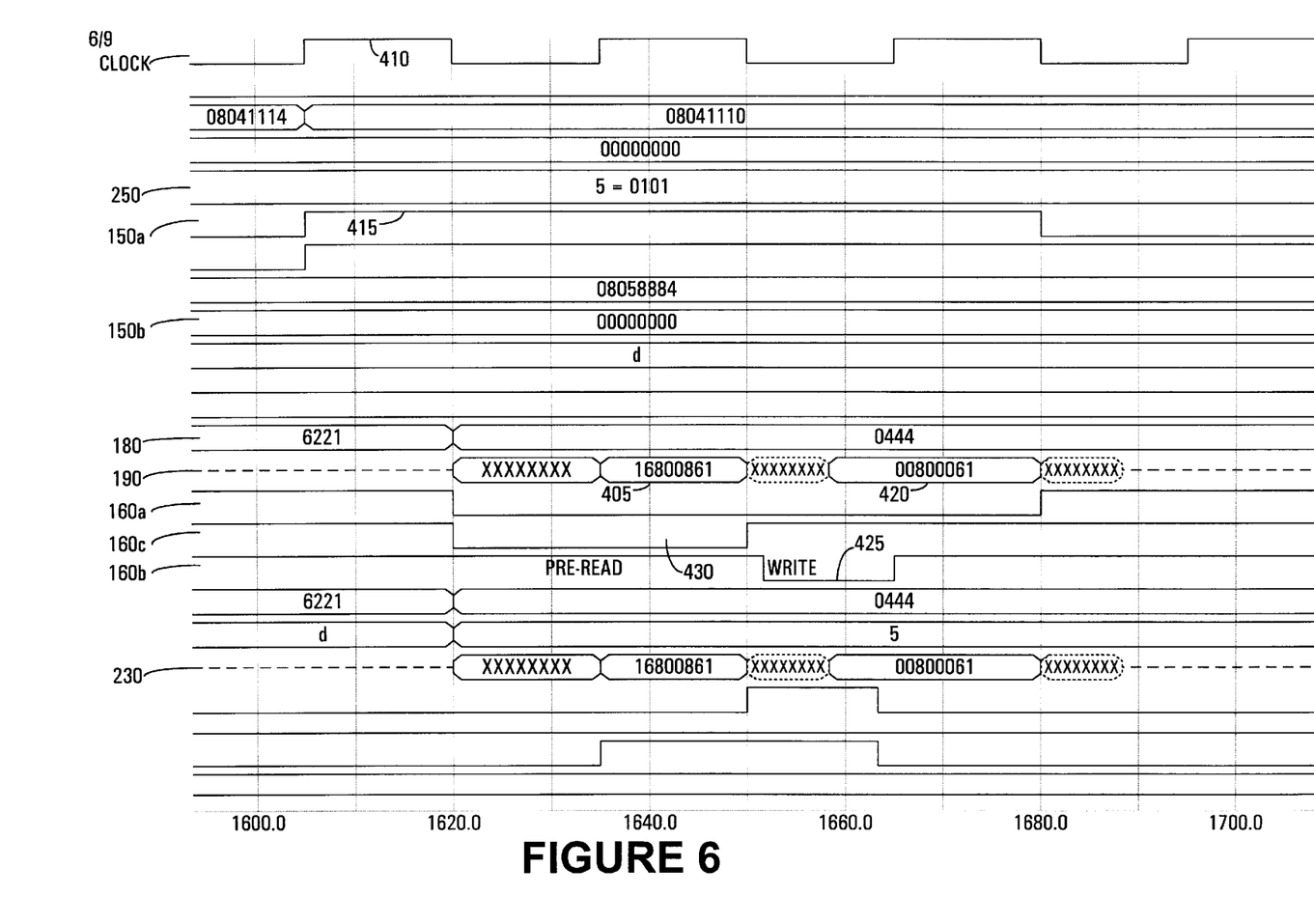
FIG. 6 is a timing diagram illustrating the states of the relevant signals used by the interface of present invention when performing a byte accessible write (e.g., a partial word write) to the memory module.

FIG. 6 is a timing diagram for the signals generated with respect to an exemplary partial word write operation in accordance with the present invention. For this discussion, reference is made with respect to FIG. 3 and FIG. 6. The interface circuit 140 is clocked by clock signal 410. Within FIG. 6, the signals are referenced by the bus on which they are carried. The value "0×0000 0000" represents the new data presented over the first internal data bus 150b. The write signal 415 becomes asserted over bus 150a to indicate that IC chip 120 is to perform a write to the external memory module 175. The control value "5," or "0101b," is presented over the control lines of multiplexer control bus 250. This indicates that a partial word write is to occur and that only two bytes are to be written. The remaining two bytes of the data word stay unchanged.

The signals for the chip enable line 160a, the output enable line 160c and the write enable line 160b are shown in FIG. 6. During pulse 430 a full word pre-read operation is performed whereby all of the byte registers 210–213 (FIG. 3) are loaded with data 405 (e.g., "0×1680 0861") from the second internal data bus 190. The value, "0×0444," represents the address presented over address bus 180. Next, the data merge takes place as the multiplexers 200–203 are controlled by the value "0101b" to rewrite the most significant byte and the second to the least significant byte of the byte registers 210–213. A full word write then takes place as indicated by pulse 425 where the value 420 (e.g., "0×0080 0061") is presented over data bus 190 and written back to the address location "0×0444" of the external memory module 175. As seen, the most significant byte and second to the least significant byte are rewritten with data from the first internal data bus 150b. Bus 230 represents the feedback bus lines which, as shown, are analogous to the second internal data bus 190. Two memory cycles are required.

Figure 7:
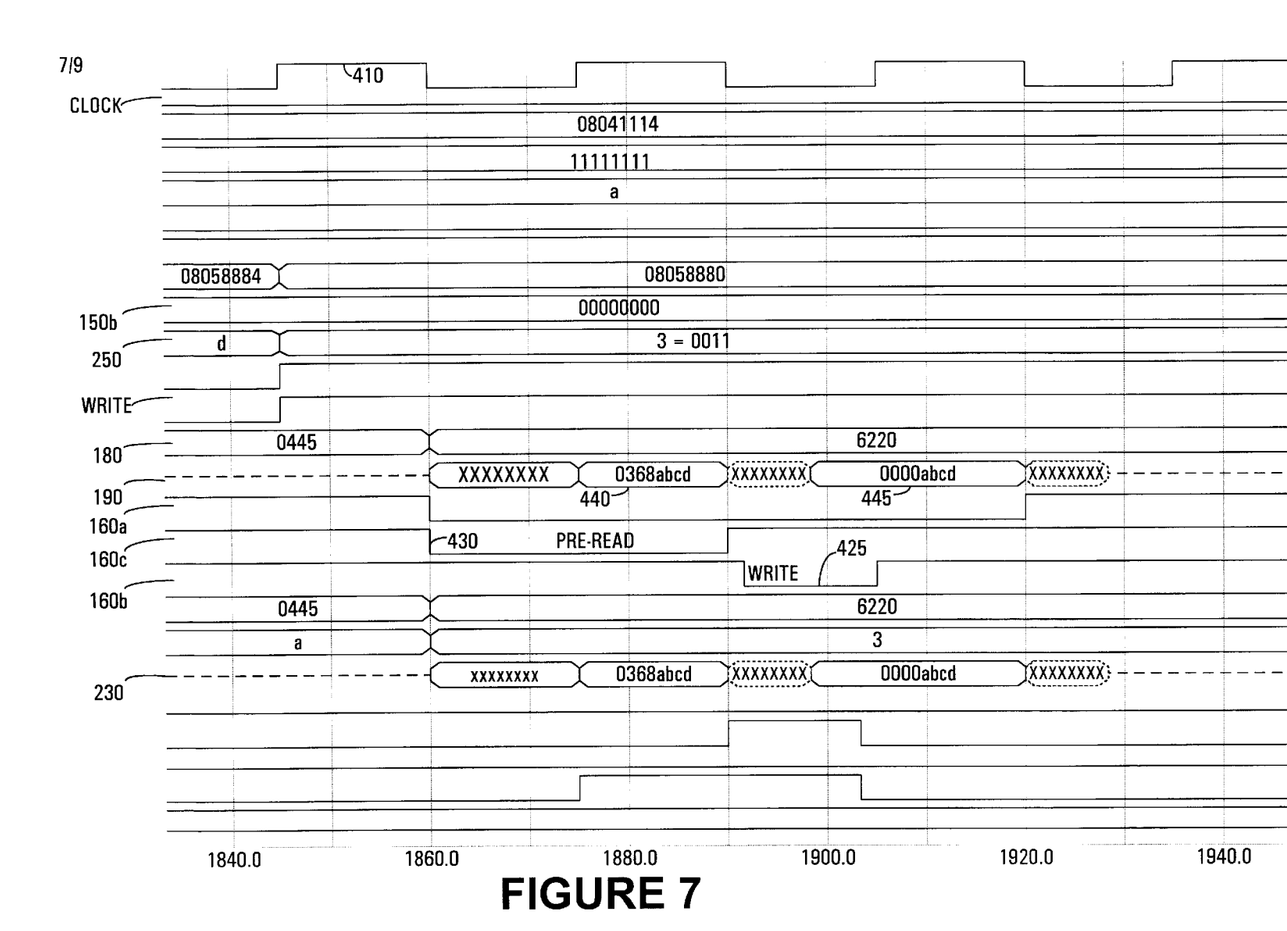
FIG. 7 is a timing diagram illustrating the states of the relevant signals used by the interface of present invention when performing a byte accessible write (e.g., a partial word write) to the memory module where different bytes are accessed compared to the timing diagram of FIG. 6.

FIG. 7 is another timing diagram for the signals generated with respect to an exemplary partial word write operation in accordance with the present invention. This partial word write is analogous to the write operation of FIG. 6 except different bytes are selected. In this example, the multiplexer control lines 250a–250d carry the value of "3" or "0011b." This indicates that the two most significant bytes are to be changed. The new data over the first internal data bus 150b is "0x0000 0000" and the data 440 "0x0368 abcd" is read over the second internal data bus 190 during the pre-read operation 430. Multiplexers are then controlled to overwrite the two most significant byte positions and the data 445 of "0x0000 abcd" is then asserted over the second internal data bus 190 (and stored in external memory module 175) during the write operation 425. Bus 230 represents the feedback bus lines which, as shown, are analogous to the second internal data bus 190. Two memory cycles are required.

Figure 8:
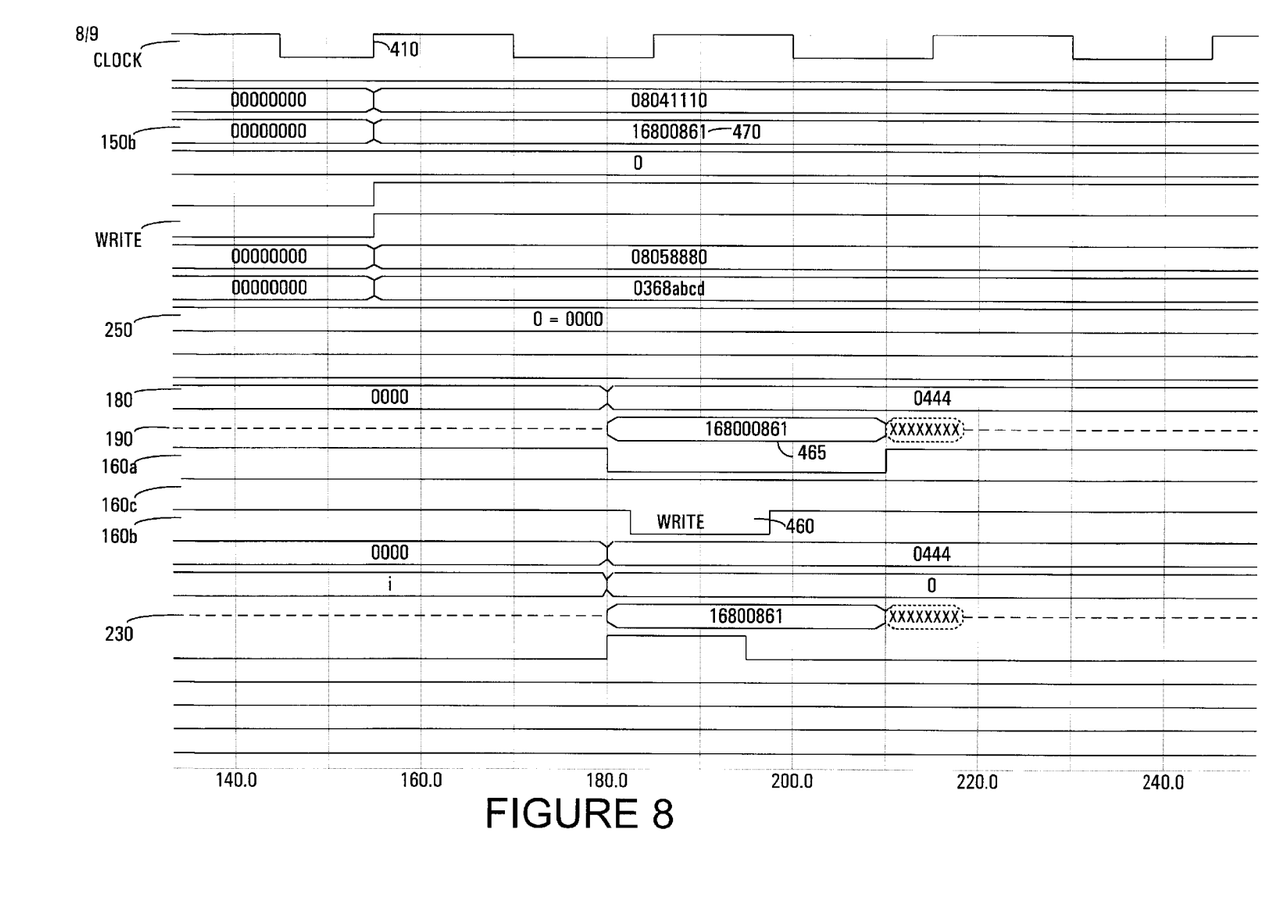
FIG. 8 is a timing diagram illustrating the states of the relevant signals used by the interface of the present invention for performing a full word write to the memory module.

FIG. 8 illustrates a timing diagram of a full data word write operation in accordance with the present invention. Data 470 of "0x1680 0861" is presented over first internal data bus 150b and latched into the registers 210–213 because the multiplexer select lines 250a–250d carry the value "0000b" indicating that all bytes are to be written. The data 465 of "0x1680 0861 " is then presented over the second internal data bus 190 which is written to the external memory module 175 during the write operation 460. Memory address "0x0444" is accessed. One memory cycle is required to perform the full word write operation.

Figure 9:
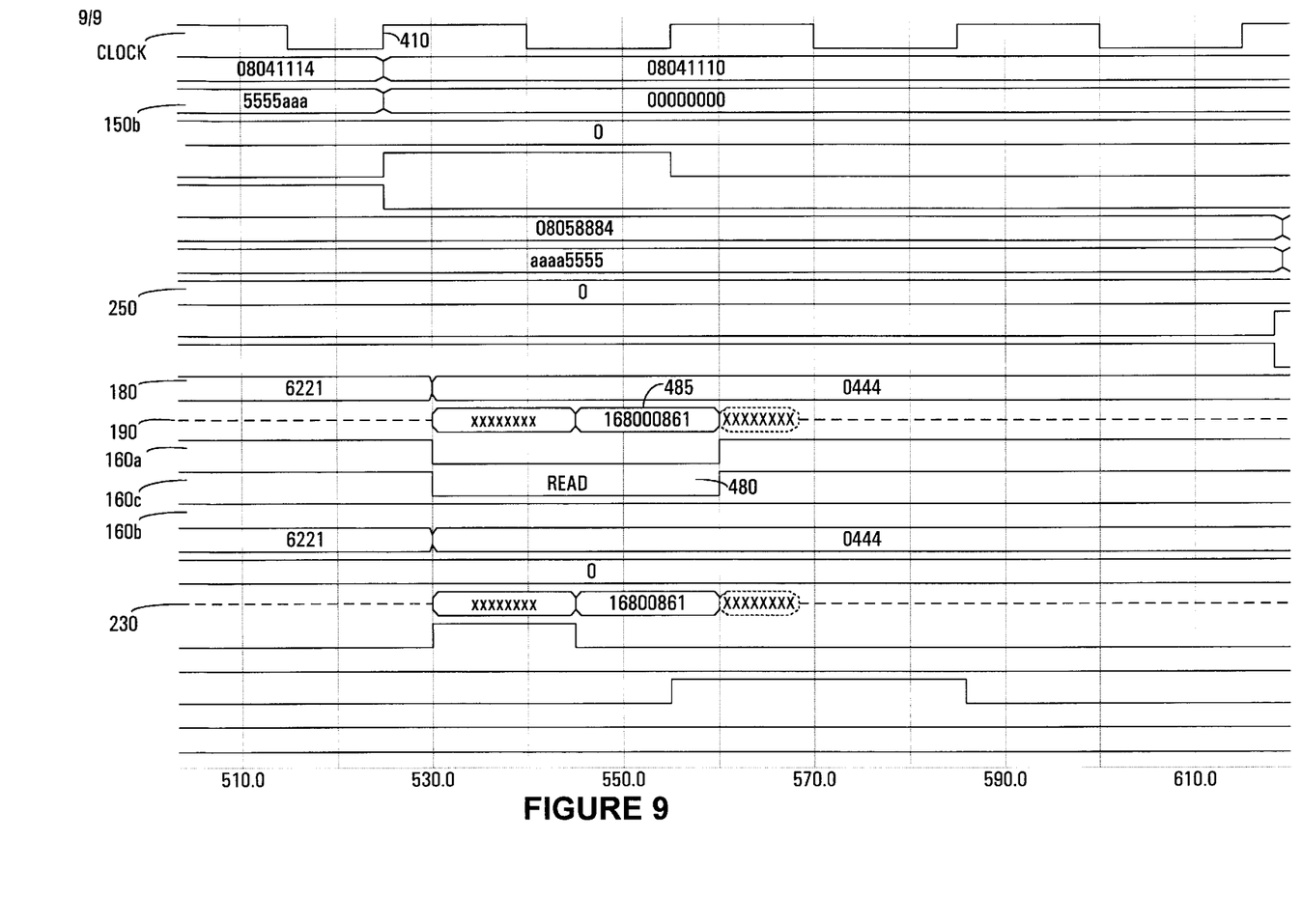
FIG. 9 is a timing diagram illustrating the states of the relevant signals used by the interface of the present invention for performing a full word read from the memory module.

FIG. 9 illustrates a timing diagram of a full data read operation in accordance with the present invention. The read operation is performed at 480 causing the data 485 of "0x1680 0861" to be presented over the second internal address bus 190. Memory address "0x0444" is accessed. One memory cycle is required to perform the full word read operation.

The preferred embodiment of the present invention, a byte accessible memory interface circuit having a reduced set of memory control signals for reduced IC pin count, is described. While the present invention has been described in particular embodiments, it should be appreciated that the present invention should not be construed as limited by such embodiments, but rather construed according to the below claims.

What is claimed is:

1. An integrated circuit device for performing byte accessible memory operations with an external memory module having memory integrated circuit (IC) chips, said integrated circuit device comprising:

a first internal data bus having a plurality of individual byte portions;

a plurality of multiplexers coupled to said first internal data bus wherein each multiplexer of said plurality of multiplexers is coupled to a respective byte portion of said plurality of individual byte portions of said first internal data bus;

a plurality of registers coupled to said plurality of multiplexers wherein each register is coupled to an output of a respective multiplexer of said plurality of multiplexers;

a second internal data bus for coupling to said external memory module, said second internal data bus having a plurality of individual byte portions wherein each byte portion is coupled to an output of a respective register, wherein further, each byte portion of said second internal data bus is also coupled back to an input of its associated multiplexer;

a single chip enable pad for commonly controlling all memory IC chips of said memory module; and a state machine circuit for performing partial word write operations by:

preloading a full word of data from said external memory module into said plurality of registers by controlling all of said plurality of multiplexers to select inputs coupled to said respective byte portions of said second internal data bus; and then by merging individual byte data from said first internal data bus into said full word by controlling only a portion of said plurality of multiplexers to select inputs coupled to said respective byte portions of said first internal data bus.

2. An integrated circuit device as described in claim 1 and further comprising a state machine circuit for controlling a full word data write operation to said external memory module by controlling all of said plurality of multiplexers to select data over said first internal data bus to load said plurality of registers with a full word of data from said first internal data bus.

3. An integrated circuit device as described in claim 1 and further comprising a state machine circuit for controlling a partial word data write operation to said external memory module by controlling only a portion of said plurality of multiplexers to select data over said first internal data bus to load only a portion of said plurality of registers with byte data from said first internal data bus.

4. An integrated circuit device as described in claim 2 wherein said state machine circuit is also for controlling a partial word data write operation to said external memory module by controlling only a portion of said plurality of multiplexers to select data over said first internal data bus to load only a portion of said plurality of registers with byte data from said first internal data bus.

5. An integrated circuit device as described in claim 1 wherein said first internal data bus and said second internal data bus are each 32-bits wide and wherein said plurality of registers are each 8-bits wide.

6. A digital system comprising:

an external memory module comprising memory integrated circuit (IC) chips; and an integrated circuit device for performing byte accessible memory operations with said external memory module, said integrated circuit device comprising:

a first internal data bus having a plurality of individual byte portions;

a plurality of multiplexers coupled to said first internal data bus wherein each multiplexer of said plurality of multiplexers is coupled to a respective byte portion of said plurality of individual byte portions of said first internal data bus;

a plurality of registers coupled to said plurality of multiplexers wherein each register is coupled to an output of a respective multiplexer of said plurality of multiplexers;

a second internal data bus for coupling to said external memory module, said second internal data bus having a plurality of individual byte portions wherein each byte portion is coupled to an output of a respective register, wherein further, each byte portion of said second internal data bus is also coupled back to an input of its associated multiplexer; and a single chip enable pad, a single output enable pad and a single write enable pad coupled in parallel to each memory IC chip for commonly controlling all memory IC chips of said memory module.

7. A digital system as described in claim 6 and further comprising a state machine circuit for controlling a full word data write operation to said external memory module by controlling all of said plurality of multiplexers to select data over said first internal data bus to load said plurality of registers with a full word of data from said first internal data bus.

8. A digital system as described in claim 6 and further comprising a state machine circuit for controlling a partial word data write operation to said external memory module by controlling only a portion of said plurality of multiplexers to select data over said first internal data bus to load only a portion of said plurality of registers with byte data from said first internal data bus.

9. A digital system as described in claim 8 wherein said state machine circuit is also for controlling a partial word data write operation to said external memory module by controlling only a portion of said plurality of multiplexers to select data over said first internal data bus to load only a portion of said plurality of registers with byte data from said first internal data bus.

10. A digital system as described in claim 6 wherein said first internal data bus and said second internal data bus are each 32-bits wide and wherein said plurality of registers are each 8-bits wide.

11. A method for performing partial word write operations between an integrated circuit chip to an external memory module having memory integrated circuit chips, said method comprising the steps of:

a) receiving byte data over a first internal data bus, said byte data to be written into a word location of said external memory module;

b) performing a pre-read operation by generating control signals common to all of said memory integrated circuit chips of said external memory module to cause an existing full word of data to be read, in one memory cycle, from said word location and loaded into a plurality of register circuits within said integrated circuit chip;

c) merging said byte data into said existing full word of data to generate a new full word of data by storing said byte data of said first internal data bus into selected registers of said plurality of registers; and d) performing a write operation by generating control signals common to all of said memory integrated circuit chips of said external memory module to cause said new full word of data to be written, in one memory cycle, into said external memory module at said word location.

12. A method as described in claim 11 wherein said plurality of registers are byte registers.

13. A method as described in claim 11 wherein said step b) comprises the steps of:

generating a single chip enable signal common to all of said memory integrated circuit chips;

generating a single output enable signal common to all of said memory integrated circuit chips;

generating a single write enable signal common to all of said memory integrated circuit chips;

receiving said existing full word of data over a second internal data bus that is coupled to said external memory module; and controlling a set of multiplexers to route said existing full word of data from said second internal data bus into said plurality of registers.

14. A method as described in claim 13 wherein said step c) comprises the step of controlling a portion of said set of multiplexers to route said byte data from said first internal data bus into said selected registers of said plurality of registers.

15. A method as described in claim 14 wherein said first internal data bus and said second internal data bus are each 32-bits wide and wherein said plurality of registers are each 8-bits wide.

16. A method as described in claim 11 wherein said first internal data bus is 32-bits wide and wherein said plurality of registers are each 8-bits wide.

* * * * *